United States Patent [19]

Noda et al.

[11] Patent Number: 5,120,379
[45] Date of Patent: Jun. 9, 1992

[54] SEALANT FOR DOUBLE-LAYERED GLASS

[75] Inventors: Koji Noda; Masavoshi Imanaka; Hiroshi Fujisawa; Hiroshi Wakabayashi, all of Hyogo, Japan

[73] Assignee: Kanegafuchi Kagaku Kogyo Kabushiki Kaisha, Osaka, Japan

[21] Appl. No.: 422,180

[22] Filed: Oct. 16, 1989

Related U.S. Application Data

[62] Division of Ser. No. 257,618, Oct. 14, 1988, abandoned.

[30] Foreign Application Priority Data

Dec. 21, 1987 [JP] Japan .................. 62-324875
Oct. 16, 1989 [JP] Japan .................. 62-262491

[51] Int. Cl.$^5$ .............................. C03C 27/00
[52] U.S. Cl. .................. 156/107; 156/109; 428/34; 428/429; 52/788
[58] Field of Search .......... 428/34, 192, 429, 441; 525/102, 105, 100; 156/107, 109, 99; 52/788, 790, 171, 172

[56] References Cited

U.S. PATENT DOCUMENTS

| 3,644,315 | 2/1972 | Gardner | 525/102 |
| 3,998,680 | 12/1976 | Flint | 428/34 |
| 4,215,164 | 7/1980 | Bowser | 428/34 |
| 4,904,732 | 2/1990 | Iwahara | 525/288 |

FOREIGN PATENT DOCUMENTS 0053022 6/1982 United Kingdom .

Primary Examiner—Ellis P. Robinson
Assistant Examiner—Donald J. Loney
Attorney, Agent, or Firm—Armstrong, Nikaido, Marmelstein, Kubovcik & Murray

[57] ABSTRACT

A sealant for double-layered glass contains a saturated hydrocarbon based polymer having at least one silicon-containing group that has a hydroxyl group or a hydrolyzable group bonded to a silicon atom and which is capable of crosslinking by forming siloxane bond.

4 Claims, No Drawings

SEALANT FOR DOUBLE-LAYERED GLASS

This is a division, of application Ser. No. 257,618 filed Oct. 14, 1988 is now abandoned.

FIELD OF THE INVENTION

The present invention relates to a sealant for double-layered glass which contains a saturated hydrocarbon based polymer having at least one silicon-containing group that has a hydroxyl group or a hydrolyzable group bonded to a silicon atom and which is capable of crosslinking by forming a siloxane bond (this silicon-containing group is hereinafter referred to as a reactive silicon group).

PRIOR ART

Double-layered glass which consists of two or more glass sheets placed in superposition has been used for the purpose of improving various properties of glass such as heat insulation and sound attenuation. In double-layered glass, the space between the glass sheets is isolated from the outside and can be called a "dead air space". In order to form a dead air space, a spacing member is interposed as required between the glass sheets in their peripheral areas, with a rubber like sealant being used in combination with the sacing member.

The most important characteristics demanded of rubber-like sealants used in the manufacture of double-layered glass are: (1) that they should be capable of ensuring consistent and long-term bonding between two glass sheets or between each of the two glass sheets and a spacing member (which is typically made of metal and which serves to keep the two glass sheets at a certain distance apart); and (2) that they should not admit moisture into the dry air confined in the dead air space.

Sealants that satisfy the first requirement are those which cure at room temperature, such as silicon-based sealants and Thiokol (tradename of Thiokol Chemical Corp., USA). Sealants that meet the second requirement are isobutylene-based hot melt sealants. However, very few sealants conventionally used satisfy the two requirements at the same time. Under these circumstances, two alternative techniques have been adopted one is a so-called "double seal technique" which employs two different sealants that possess the respective characteristics. The other technique is the use of a sealant in combination with an isobutylene-based rubber gasket having low moisture permeability. However, both techniques involve complicated steps and are not efficient in operation.

In order to solve these problems, butyl rubber based sealants that possess the two requirements set forth above have been under review (see Unexamined Published Japanese Patent Application No. 62-571). These types of sealants have the advantages that they need not be heated and that they permit the use of a single-seal technique. On the other hand, they have low storage stability and cannot be employed unless they are designed as two-component sealants. In addition to this low operational efficiency, these sealants suffer a disadvantage in that their performance properties including weatherability and mechanical characteristics are not satisfactory.

SUMMARY OF THE INVENTION

An object, therefore, of the present invention is to provide a sealant for double-layered glass that possesses both of the requirements set forth above and which has good storage stability and performance properties, in particular, high weatherability and mechanical characteristics, with the additional advantage of being usable as a one-component sealant.

In order to attain this object, the present inventors conducted intensive studies and successfully found a new desired sealant. The present invention has been accomplished on the basis of this finding.

The above-stated object of the present invention can be attained by a sealant for double-layered glass which contains a saturated hydrocarbon based polymer having at least one silicon-containing group that has a hydroxyl group or a hydrolyzable group bonded to a silicon atom and which is capable of crosslinking by forming a siloxane bond.

DETAILED DESCRIPTION OF THE INVENTION

The most important feature of the present invention is to use a saturated hydrocarbon based polymer which has at least one reactive silicon group. This saturated hydrocarbon based polymer is hereinafter suffixed by (A).

Typical examples of the reactive silicon group are those which are represented by general formula (1):

wherein each of $R^1$ and $R^2$ is independently a substituted or unsubstituted alkyl group having 1–20 carbon atoms, a substituted or unsubstituted aryl group having 6–20 carbon atoms, a substituted or unsubstituted aralkyl group having 7–20 carbon atoms, or a triorganosiloxy group represented by $(R')_3SiO-$ (where $R'$ is a monovalent hydrocarbon group having 1–20 carbon atoms, and the three groups denoted by $R'$ may be the same or different), and when more than one $R^1$ or $R^2$ is present, they may be the same or different; X is a hydroxyl group or a hydrolyzable group, and when more than one X is present, they may be the same or different; a is 0, 1, 2 or 3, and b is 0, 1 or 2, provided that the sum of a and b is not less than 1; m is 0 or an integer of 1–19; and when m is 2 or more, b in

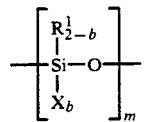

need not be the same.

Specific examples of the hydrolyzable group denoted by X include a hydrogen atom, an alkoxy group, an acyloxy group, a ketoxymato group, an amino group, an amido group, an aminooxy group, a mercapto group, an alkenyloxy group and any other hydrolyzable group that is commonly employed in the art. Among these groups, an alkoxy group is particularly preferred since it undergoes mild hydrolysis and hence is easy to handle.

One to three hydrolyzable groups or hydroxyl groups may be bonded to one silicon atom, and the sum of a and b is preferably in the range of 1-5. When two or more hydrolyzable groups or hydroxyl groups are bonded in the reactive silicon group, they may be the same or different.

The reactive silicon group may contain one or more silicon atoms. In a case where silicon atoms are linked by a siloxane bond, no more than 20 silicon atoms are preferably contained in the reactive silicon group. Because of easy availability, a reactive silicon group represented by the following formula is preferred:

(where $R^2$, X and a are the same as defined above).

At least one reactive silicon group is present in a molecule of the saturated hydrocarbon based polymer, with the presence of 1.1-5 reactive silicon groups being preferred. If less than one reactive silicon group is present in a molecule of said polymer, the curability of the polymer is insufficient to form a satisfactory rubber-like cured product.

The reactive silicon group may be present at terminals or in the interior of the molecular chain of the saturated hydrocarbon based polymer. If desired, said group may be present both at terminals and in the interior of the molecular chain of the polymer. Preferably, the reactive silicon group is present at terminals of the molecular chain of the saturated hydrocarbon based polymer because the formation of a rubber-like cured product having high strength and elongation is facilitated. Saturated hydrocarbon based polymers having the reactive silicon group described above may be used either alone or as admixtures.

The polymer serving as the backbone of the saturated hydrocarbon based polymer (A) having a reactive silicon group may be prepared by several methods including:

(1) polymerizing $C_1-C_6$ olefinic compounds such as ethylene, propylene, 1-butene and isobutylene, with these compounds being used as principal monomers; and (2) homopolymerizing diene compounds such as butadiene and isoprene or copolymerizing them with one or more of the olefinic compounds listed above, and thereafter hydrogenating the polymers. For several reasons such as ease of introducing functional groups at terminals, ease of molecular weight control and the possibility of increasing the number of terminal functional groups, isobutylene based polymers and hydrogenated polybutadiene polymers are preferred.

The term "saturated hydrocarbon based polymer" as used herein means polymers that are substantially free from a carbon-carbon unsaturated bond other than an aromatic ring.

The isobutylene based polymer mentioned above may be such that all of the monomer units present are formed of isobutylene units. Alternatively, a monomer unit that is copolymerizable with isobutylene may be incorporated in the isobutylene based polymer preferably in an amount of up to 50% (all percents noted herein are on a weight basis), more preferably up to 30%, most preferably up to 10%.

Examples of the monomer component that is copolymerizable with isobutylene include olefins having 4-12 carbon atoms, vinyl ethers, aromatic vinyl compounds, vinylsilanes, and allylsilanes. More specific examples of such copolymerizable components are listed below: 1-butene, 2-butene, 2-methyl-1-butene, 3-methyl-1-butene, pentene, 4-methyl-1-pentene, hexene, vinylcyclohexane, methylvinyl ether, ethylvinyl either, isobutylvinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, and γ-methacryloyloxypropylmethyldimethoxysilane.

If vinylsilanes and allylsilanes are used as monomers that are copolymerizable with isobutylene, the content of silicon is increased to provide an increasing amount of a group that serves as a silane coupling agent and the resulting composition will have improved adhesion.

As in the case of the isobutylene based polymer, the hydrogenated polybutadiene polymer and other saturated hydrocarbon based polymers may optionally contain monomer units in addition to the one serving as the principal component.

The saturated hydrocarbon based polymers for use in the present invention may contain a small amount of a monomer unit such as a polyene compound (e.g. butadiene or isoprene) that leaves a double bond behind after polymerization. The amount of addition of such monomer units should not be such that the addition is detrimental to the purposes of the present invention. Preferably, such monomer units are incorporated in an amount of up to 10%, more preferably up to 5%, most preferably up to 1%.

The saturated hydrocarbon based polymer (A) preferably has a number average molecular weight of about 500-30,000. From the veiwpoint of ease of handling, those with molecular weight of about 1,000-15,000 which range from liquid to fluid in nature are preferred.

The process for producing the saturated hydrocarbon based polymer having a reactive silicon group is described hereinafter with reference to the cases of polyisobutylene and hydrogenated polybutadiene. An isobutylene based polymer having a reactive silicon group at terminals of the molecular chain can be produced from terminal functional, preferably totally terminal functional, isobutylene based polymers that are prepared by a polymerization technique called the Inifer method described in U.S. Pat. Nos. 4,276,394, 4,316,973 and 4,342,849 (i.e., a cationic polymerization process using a particular compound called "Inifer" which serves both as an initiator and a chain transfer agent). For instance, polyisobutylene having a terminal olefin group and a hydrosilane compound having a hydrogen atom bonded to a group represented by the general formula (1), preferably a compound represented by the following general formula:

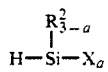

(where $R^2$, X and a are each the same as defined above), are subjected to an addition reaction in the presence of a Pt-base catalyst. For further details of this process, see European Patent Publication A1-0252,372.

An isobutylene based polymer containing a reactive silicon group in the interior of its molecular chain can be produced by adding vinylsilanes or allylsilanes having a reactive silicon group to monomers based on isobutylene and subjecting them to copolymerization.

When performing polymerization in producing isobutylene based polymers having a reactive silicon group at terminals of their molecular chain, an isobutylene monomer as the main component is copolymerized with silanes or allylsilanes having a reactive silicon group and thereafter a reactive silicon group is introduced at terminals of the copolymer, thereby producing an isobutylene based polymer having a reactive silicon group both at terminals and within the interior of its molecular chain.

Specific examples of the vinylsilanes and allylsilanes having a reactive silicon group include: vinyltrichlorosilane, vinylmethyldichlorosilane, vinyldimethylchlorosilane, vinyldimethylmethoxysilane, divinyldichlorosilane, divinyldimethoxysilane, allyltrichlorosilane, allylmethyldichlorosilane, allyldimethylchlorosilane, allyldimethylmethoxysilane, diallyldichlorosilane, diallyldimethoxysilane, γ-methacryloyloxypropyltrimethoxysilane, and γ-methacryloyloxypropylmethyldimethoxysilane.

A hydrogenated polybutadiene polymer having a reactive silicon group may be produced by the following procedures: hydroxyl groups in a hydroxyl terminated hydrogenated polybutadiene polymer are converted to oxymetal groups such as —ONa and —OK; and reacting said polymer with an organohalogen compound represented by the general formula (2):

$$CH_2=CH-R^3-Y \qquad (2)$$

where Y is a halogen atom such as Cl or I; $R^3$ is a divalent organic group represented by —$R^4$—,

(where $R^4$ is a divalent hydrocarbon group having 1-20 carbon atoms, for example, alkylene, cycloalkylene, arylene or aralkylene group), with $R^3$ being preferably selected from among —$CH_2$—, and

(R" is a hydrocarbon group having 1-10 carbon atoms). As a result of these steps, a hydrogenated polybutadiene polymer having a terminal olefin group is produced (this polymer is hereinafter referred to as an olefin terminated hydrogenated polybutadiene polymer).

Terminal hydroxyl groups in the hydroxy terminated hydrogenated polybutadiene polymer may be converted to oxymetal groups by reacting it with an alkali metal such as Na or K, a metal hydroxide such as NaH, a metal alkoxide such as $NaOCH_3$, or a caustic alkali such as caustic soda or caustic potash.

The above-described method enables the production of an olefin terminated hydrogenated polybutadiene polymer whose molecular weight is substantially equal to that of the hydroxy terminated hydrogenated polybutadiene polymer used as the starting material. If polymers with higher molecular weights are desired, reaction with an organohalide compound of the general formula (2) may be preceded by reaction with a polyvalent organohalide compound containing at least two halogens in the molecule as exemplified by methylene chloride, bis(chloromethyl)benzene or bis(chloromethyl)ether. If this reaction is followed by reaction with an organohalide compound of the general formula (2), a hydrogenated polybutadiene polymer with a higher molecular weight which has an olefin group at terminals can be obtained.

The organohalide compounds of general formula (2) include, but are not limited to, the following: allyl chloride, allyl bromide, vinyl(chloromethyl)benzene, allyl(chloromethyl)benzene, allyl(bromomethyl)benzene, allyl(chloromethyl)ether, allyl(chloromethoxy)benzene, 1-butenyl(chloromethyl)ether, 1-hexenyl(chloromethoxy)benzene, and allyloxy(chloromethyl)benzene. Among these examples, allyl chloride is preferred because of its low cost and easy availability for reaction.

As in the case of isobutylene based polymers having a reactive silicon group at terminals of the molecular chain, a reactive silicon group can be introduced into the olefin terminated hydrogenated polybutadiene polymer by performing an addition reaction with a hydrosilane compound having a hydrogen atom bonded to the group of general formula (1), preferably a compound represented by the following general formula:

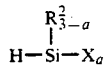

(where $R^2$, X, and a are each as defined above) in the presence of a Pt type catalyst.

The hydrosilane compounds having a hydrogen atom bonded to the group of the general formula (1) include, but are not limited to, the following: halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane and phenyldimethoxysilane; acyloxysilanes such as methyldiacetoxysilane and phenyldiacetoxysilane; and ketoxymate silanes such as bis(dimethylketoxymate)methylsilane and bis(cyclohexylketoxymate)methylsilane. Among these examples, halogenated silanes and alkoxysilanes are particularly preferred.

Sealants containing the saturated hydrocarbon based polymer of the present invention which contains a reactive silicon group have the advantage that their weatherability is much improved over sealants that contain conventional rubber-like polymers such as organic polymers having unsaturated bonds or oxyalkylene based polymers. In addition, being based on hydrocarbons, the polymers used in the present invention provide good moisture barrier properties and high water resistance; at the same time, they exhibit strong adhesion to a variety of inorganic substrates including glass and aluminum, and form cured products that have low moisture permeability.

The content of the saturated hydrocarbon based polymer (A) in the sealant of the present invention is preferably at least 10%, more preferably at least 30%, with 50% or more being most preferred.

A variety of additives may be incorporated in the sealant of the present invention as required. Illustrative additives that can be incorporated include: curing catalysts which promote a silanol condensation reaction; physical property modifiers which modify the tensile characteristics of a cured product; stabilizing agents which prevent the sealant of the present invention from curing during storage; plasticizers; fillers; adhesion improving agents; antioxidants; radical inhibitors; UV absorbers; metal inactivators; ozone degradation inhibitors; photostabilizers; phosphorus peroxide decomposing agents; lubricants; pigments; and foaming agents.

Specific examples of curing catalysts are: titanate esters such as tetrabutyl titanate and tetrapropyl titanate; tin carboxylates such as dibutyltin dilaurate, dibutyltin maleate, dibutyltin diacetate, tin octylate and tin naphthenate; the reaction products of dibutyltin oxide and phthalate esters; dibutyltin diacetylacetonate; organoaluminum compounds such as aluminum tris-acetylacetonate, aluminum tris-ethylacetoacetate and diisopropoxyaluminum ethylacetoacetate; chelate compounds such as zirconium tetraacetylacetonate and titanium tetraacetylacetonate; lead octylate; amine based compounds or salts thereof with acids such as carboxylic acids, including butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo(5,4,0)undecene-7 (DBU); low-molecular weight polyamide resins prepared by reaction between excess polyamines and polybasic acids; the reaction products of excess polyamines and epoxy compounds; and silane coupling agents having an amino group, as exemplified by γ-aminopropyltrimethoxysilane and N-(β-aminoethyl)aminopropylmethyl dimethoxysilane, and other known silanol condensation catalysts including acidic and basic catalysts. The above-listed curing catalysts may be used either alone or as admixtures. If curing catalysts are to be used at all, the amount of their addition preferably ranges from 0.1 to 20 parts (all parts noted herein are on a weight basis), more preferably from 1 to 10 parts, per 100 parts of the saturated hydrocarbon based polymer (A).

Illustrative physical property modifiers are various silicon compounds having hydroxyl group or a hydrolyzable group bonded to a silicon atom. Specific examples of such compounds are listed below:

(CH$_3$)$_3$SiOH, (C$_2$H$_5$)$_3$SiOH, (C$_3$H$_7$)$_3$SiOH, (C$_6$H$_5$)$_3$SiOH, (C$_6$H$_5$)$_2$Si(OH)$_2$, (C$_6$H$_5$)$_2$Si(CH$_3$)OH, C$_6$H$_5$Si(CH$_3$)(OH)$_2$,

C$_6$H$_5$Si(CH$_2$CH$_3$)(OH)$_2$,

C$_6$H$_5$Si(CH$_3$)$_2$OH,

HO⁻⁺Si(CH$_3$)$_2$O⁻$_{\overline{2\ to\ 20}}$ R.

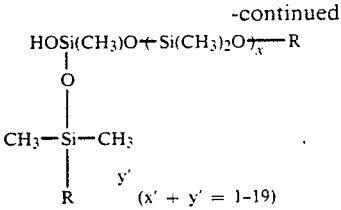
(x' + y' = 1-19)

HO⁻⁺Si(C$_6$H$_5$)$_2$O⁻$_{\overline{2\ to\ 20}}$R,

HO⁻⁺Si(C$_6$H$_5$)$_2$O⁻$_{\overline{p}}$⁻⁺Si(CH$_3$)$_2$O⁻$_{\overline{q}}$R.
(p + q = 2-20)

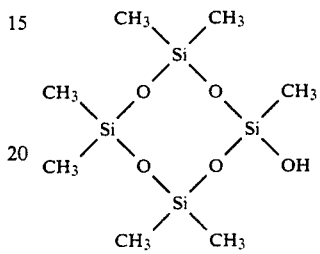

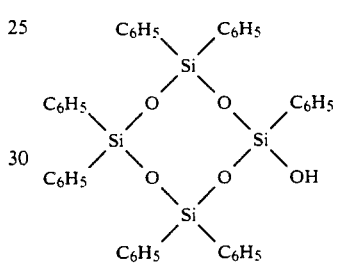

HO⁻⁺Si(CH$_3$)$_2$O⁻$_{\overline{2-20}}$H, HO⁻⁺Si(CH$_3$)(C$_6$H$_5$)O⁻$_{\overline{2-20}}$H.

HO⁻⁺Si(C$_6$H$_5$)$_2$O⁻$_{\overline{2-20}}$H,

HO—Si(C$_6$H$_5$)$_2$⁻⁺OSi(CH$_3$)$_2$⁻$_{\overline{0-18}}$OSi(C$_6$H$_5$)$_2$OH.

HO—Si(C$_6$H$_5$)$_2$⁻⁺OSi(CH$_3$)$_2$⁻$_{\overline{x}}$⁻⁺OSi(C$_6$H$_5$)$_2$⁻$_{\overline{y}}$OSi(C$_6$H$_5$)$_2$OH.
(x + y = 0-18)

HO⁻⁺Si(C$_6$H$_5$)(CH$_3$)O⁻$_{\overline{2-10}}$⁻⁺Si(CH$_3$)$_2$O⁻$_{\overline{2-20}}$H.

CH$_3$O⁻⁺Si(CH$_3$)(C$_6$H$_5$)O⁻$_{\overline{2-20}}$CH$_3$.

CH$_3$O⁻⁺Si(C$_6$H$_5$)$_2$O⁻$_{\overline{2-20}}$CH$_3$.

CH$_3$OSi(C$_6$H$_5$)$_2$⁻⁺OSi(CH$_3$)$_2$⁻$_{\overline{0-18}}$OSi(C$_6$H$_5$)$_2$OCH$_3$.

CH$_3$OSi(C$_6$H$_5$)$_2$⁻⁺OSi(CH$_3$)$_2$⁻$_{\overline{x}}$OSi(C$_6$H$_5$)$_2$⁻$_{\overline{y}}$OSi(C$_6$H$_5$)$_2$OCH$_3$.
(x + y = 0-18)

CH$_3$Si(OCH$_3$)$_3$, (CH$_3$)$_2$Si(OCH$_3$)$_2$.

(CH$_3$CH$_2$)$_2$Si(OCH$_3$)$_2$, (CH$_3$)Si(OCH$_2$CH$_3$)$_2$, (CH$_3$CH$_2$)$_2$Si(OCH$_2$CH$_3$)$_2$, Si(OC$_2$H$_5$)$_4$,

C$_6$H$_5$Si(OCH$_3$)$_3$, (C$_6$H$_5$)$_2$Si(OCH$_3$)$_2$.

(C$_6$H$_5$)$_2$Si(OCH$_2$CH$_3$)$_2$,

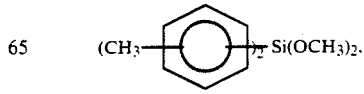

(CH$_3$)$_2$Si(OCH$_2$CH$_2$OCH$_3$)$_2$.

-continued (CH$_3$CH$_2$)$_2$Si(OCH$_2$CH$_2$OCH$_3$)$_2$.

(CH$_3$)(CH$_3$CH$_2$)Si(OCH$_3$)$_2$.

C$_6$H$_5$Si(CH$_3$)(OCH$_3$)$_2$.   C$_6$H$_5$Si(CH$_2$CH$_3$)(OCH$_3$)$_2$.

CH$_2$=CHSi(OCOCH$_3$)$_3$.

CH$_3$Si(ON=C(CH$_3$)(C$_2$H$_5$))$_3$.

CH$_3$Si(N(CH$_3$)$_2$)$_3$,   CH$_3$Si(ON(CH$_3$)(C$_2$H$_5$))$_3$,

CH$_3$Si(N(CH$_3$)(OCCH$_3$))$_3$,   CH$_3$Si(OC(CH$_3$)=CH$_2$)$_3$,

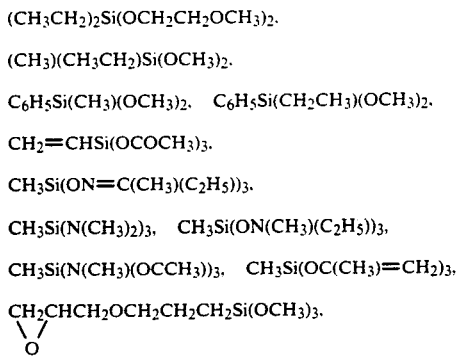

H$_2$NCH$_2$CH$_2$CH$_2$Si(OCH$_3$)$_3$,

H$_2$NCH$_2$CH$_2$NHCH$_2$CH$_2$CH$_2$Si(OCH$_3$)$_3$.

CH$_2$=C(CH$_3$)COOCH$_2$CH$_2$CH$_2$Si(OCH$_3$)$_3$.

HSCH$_2$CH$_2$CH$_2$Si(OCH$_3$)$_3$.   (CH$_3$)$_3$SiNHSi(CH$_3$)$_3$.

(CH$_3$)$_3$SiN(CH$_3$)$_2$.

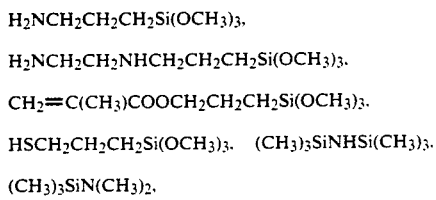

(CH$_3$)$_3$Si—NH—CO—NH—Si(CH$_3$)$_3$.

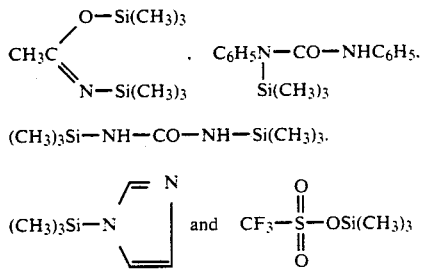

The above-listed silicon compounds having at least one hydrolyzable group or silanol group, and partially hydrolyzed condensation products of these silicon compounds are by no means the sole examples of the compounds that can be used as physical property modifiers in the present invention. In the formulas noted above, R denotes a hydrogen atom or a hydrocarbon group having 1-20 carbon atoms. If physical property modifiers are to be used at all, the amount of their addition preferably ranges from 0.1 to 10 parts, more preferably from 1 to 5 parts, per 100 parts of the saturated hydrocarbon based polymer (A).

Illustrative stabilizing agents are compounds having a hydrolyzable group bonded to a silicon atom, as well as orthoorganic acid esters. Specific examples of such storage stability improving agents are those compounds listed above as physical property modifiers and which have a hydrolyzable group bonded to a silicon atom, as well as methyl orthoformate. If reserve stability improving agents are to be used at all, the amount of their addition preferably ranges from 0.5 to 20 parts, more preferably from 1 to 10 parts, per 100 parts of the saturated hydrocarbon based polymer (A).

There also is no particular limitation on the plasticizers that can be added and any common plasticizer may be employed. Plasticizers having good miscibility with the composition of the present invention are preferred. Specific examples of such plasticizers are: hydrocarbon based compounds such as polybutene, hydrogenated polybutene, ethylene/α-olefin oligomers, α-methylstyrene oligomers, biphenyl, triphenyl, triaryldimethane, alkylenetriphenyl, hydrogenated liquid polybutadiene, alkyldiphenyl, partially hydrogenated terphenyl, paraffinic oil, naphthenic oil and atactic polypropylene. Of these, unsaturated bond free hydrogenated polybutene, hydrogenated liquid polybutadiene, paraffinic oil, naphthenic oil and atactic polypropylene being preferred. Other useful plasticizers include chlorinated paraffines; phthalate esters such as dibutyl phthalate, diheptyl phthalate, di(2-ethylhexyl)phthalate, butylbenzyl phthalate and butylphthalylbutyl glycolate; non-aromatic diba ic acid esters such as dioctyl adipate and dioctyl sebacate; polyalkylene glycol esters such as diethylene glycol benzoate and triethylene glycol dibenzoate; and phosphate esters such as tricresyl phosphate and tributyl phosphate. These plasticizers may be used either alone or in admixtures. Among the compounds listed above, hydrocarbon based compounds without a carbon-carbon unsaturated bond are preferred since they have good miscibility with the saturated hydrocarbon based polymer (A), exhibit high weatherability, cause only small effects on the curing rate of a sealant, and are inexpensive. These plasticizers may be used in place of solvents for attaining such purposes as adjustment of the reaction temperature and the viscosity of the reaction system when introducing a reactive silicon group into the saturated hydrocarbon based polymer. If plasticizers are to be used at all, the amount of their addition preferably ranges from 10 to 500 parts, more preferably from 20 to 300 parts, per 100 parts of the saturated hydrocarbon based polymer (A).

Specific examples of a filler include, but are not limited to, asbestos, glass fibers, carbon fibers, mica, graphite, diatomaceous earth, chiva clay, fumed silica, precipitated silica, silicic anhydride, carbon black, calcium carbonate, clay, talc, titanium oxide, magnesium carbonate, quartz, fine aluminum powder, flint powder and zinc powder. Among these fillers, those having thixotropic properties such as precipitated silica, fumed silica and carbon black, as well as calcium carbonate, titanium oxide and talc are preferred. If fillers are to be used at all, the amount of their addition preferably ranges from 10 to 500 parts, more preferably from 20 to 300 parts, per 100 parts of the saturated hydrocarbon based polymer (A).

Illustrative adhesion improving agents that can be used in the present invention include common adhesives, silane coupling agents such as aminosilane compounds and epoxysilane compounds, and other compounds. Specific examples of such adhesion improving agents include phenolic resins, epoxy resins, γ-aminopropyltrimethoxysilane, N(β-aminoethyl)aminopropylmethyl dimethoxysilane, coumaroneindene resins, rosin ester resins, terpene-phenolic resins, α-methylstyrene/-vinyl toluene copolymers, polyethyl-methylstyrene, alkyl titanates, and aromatic polyisocyanates. If adhesion improving agents are to be used at all, the amount of their addition preferably ranges from 1 to 50 parts, preferably from 5 to 30 parts, per 100 parts of the saturated hydrocarbon based polymer (A).

Useful antioxidants are those compounds which are commonly employed as antioxidants and may be exemplified by citric acid, phosphoric acid and sulfur based antioxidants.

Illustrative sulfur based antioxidants are listed below: mercaptans, mercaptan salts, sulfides including sulfide carboxylic acid esters and hindered phenolic sulfides, polysulfides, dithiocarboxylic acid salts, thioureas, thiophosphates, sulfonium compounds, thioaldehydes, thioketones, mercaptals, mercaptols, monothioacids, polythioacids, thioamides, sulfoxides, etc.

More specific examples of such sulfur based antioxidants are as follows: 2-mercaptobenzothiazole which is a mercaptan; a zinc salt of 2-mercaptobenzothiazole which is a salt of a mercaptan; 4,4'-thio-bis(3-methyl-6-t-butylphenol), 4,4'-thio-bis(2-methyl-6-t-butylphenol), 2,2'-thio-bis(4-methyl-6-t-butylphenol), bis (3-methyl-4-hydroxy-5-t-butylbenzyl)sulfide, terephthaloyldi(2,6-dimethyl-4-t-butyl-3-hydroxybenzylsulfide, phenothiazine, 2,2'-thio-bis(4-octylphenol)nickel, dilaurylthiodipropionate, distearylthiodipropionate, dimyristylthiodipropionate, ditridecyl-thiodipropionate, distearyl-$\beta,\beta'$-thiodibutyrate, lauryl-stearyl-thiodipropionate, and 2,2-thio[diethyl-bis-3(3,5-di-t-butyl-4-hydroxyphenol)propionate], all of these compounds being sulfides; 2-benzothiazole disulfide which is a polysulfide; zinc dibutyldithiocarbamate, zinc diethyldithiocarbamate, nickel dibutyldithiocarbamate, zinc di-n-butyldithiocarbamate, dibutylammonium dibutyldithiocarbamate, zinc ethyl-phenyl-dithiocarbamate, and zinc dimethylcarbamate, all of these compounds being dithiocarboxylic acid salts; and 1-butyl-3-oxy-diethylene-2-thiourea, di-O-tolyl-thiourea, and ethylene thiourea, all being thioureas; and trilauryl trithiophosphate which is a thiophosphate. As compared with other antioxidants, these sulfur based antioxidants have the advantage that when incorporated in the composition of the present invention, they are capable of appreciably suppressing the thermal decomposition or deterioration of the backbone chain of the polymer, thereby preventing the occurrence of such phenomena as surface tack (stickiness).

If antioxidants such as sulfur based antioxidants are used at all, the amount of their addition preferably ranges from 0.01 to 50 parts, more preferably from 0.1 to 5 parts, per 100 parts of the saturated hydrocarbon based polymer (A).

Illustrative radical inhibitors include: phenolic radical inhibitors such as 2,2'-methylene-bis(4-methyl-6-t-butylphenol) and tetrakis[methylene-3(3,5-di-t-butyl-4-hydroxyphenyl)propionate]-methane; and amine based radical inhibitors such as phenyl-$\beta$-naphthylamine, naphthylamine, N,N'-sec-butyl-p-phenylenediamine, phenothiazine, and N,N'-diphenyl-p-phenylenediamine.

Illustrative uv absorbers include 2-(2'-hydroxy-3',5'-di-t-butylphenyl)benzotriazole and bis(2,2,6,6-tetramethyl-4-piperidine)sebacate.

The sealant of the present invention is typically intended to be applied to inorganic glasses but, needless to say, it may be used with organic glasses.

Spacing members for use in the manufacture of double-layered glass are typically made of metals such as aluminum and iron but other materials may of course be employed, such as plastics, reinforced plastics, glass, wood or concrete.

The double-layered glass in the manufacture of which the sealant of the present invention is to be used may be of a laminated glass type which can be handled as a single sheet. The double-layered glass may be of a type that is formed by inserting two sheets of glass into a window pane from opposite sides, with the latter being used as a spacing member. Alternatively, the double-layered glass may be of a type that is formed by placing a glass sheet in both the inside and outside of a window in a concrete building, with the concrete wall being used as a spacing member. In the case where moisture-permeable materials such as concrete are used as spacing members, care should be taken to prevent moisture from getting into the laminated glass.

The manufacture of double-layered glass using the sealant of the present invention offers an additional advantage in that there is no need to dry the air between glass sheets before curing of the sealant for the purpose of absorbing moisture during the curing step.

As described above, the polymer used as the principal component of the sealant of the present invention provides a rubber-like material that can be easily cured at room temperature to exhibit excellent mechanical properties and which ensures consistent adhesion to glass or spacing members for a prolonged time. The sealant of the present invention has good storage stabiity and remains stable for a prolonged period if it is isolated from moisture. Therefore, this sealant can be used as an excellent one-component type sealant. In addition, the sealant of the present invention can be formulated as a fluid material that has a suitable degree of viscosity or structural viscosity (thixotropic properties) at ambient temperature and this contributes such advantages as good workability in the manufacture of double-layered glass. When cured, the sealant of the present invention provides a rubber-like material that has low moisture permeability and which exhibits good weatherability and durable adhesion.

Having the above-described characteristics, the sealant of the present invention can be used as a one-component sealant in the manufacture of double-layered glass without employing a double-seal technique. Needless to say, this sealant is also compatible with a conventional double-seal technique, and if desired, may be used as a two-component sealant.

The present invention is described hereinafter with reference to preparation examples of a sealant and working examples, which are not to be construed as limiting the scope of the invention. Unless otherwise indicated, all parts, percents and ratios are by weight.

PREPARATION EXAMPLE 1

Isobutylene was polymerized with p-dicumyl chloride in the presence of a boron trichloride catalyst and thereafter hydrogen chloride was removed. Two hundred grams of an isobutylene based polymer with a molecular weight of ca. 5,000 which had isopropenyl groups at ca. 92% of all terminals and 10 g of toluene were charged into a four-necked 500-ml flask, which was degassed by evacuation at 90° C. for 2 hours. After replacing the atmosphere in the flask with nitrogen gas, the flask was charged with 120 ml of dry heptane, 11.5 g of methyldichlorosilane and 0.1 ml of a solution of a chloroplatinic acid catalyst (1 g of $H_2PtCl_6.6H_2O$ in 9 g of 1,2-dimethoxyethane and 1 g of ethanol) at room temperature and the contents were subjected to reaction at 90° C. for 12 hours.

The amount of residual isopropenyl group in the isobutylene based polymer in the reaction solution as measured by an IR spectrum analysis was very small and almost negligible.

Thereafter, 21.2 g of methyl orthoformate and 6.4 g of methanol were added to the reaction system, which was heated at 70° C. for 3 hours. At this point of time, the reaction system was substantially neutral (pH ≈ 7). After distilling off the volatile matter under vacuum, 50 ml of hexane was added to the residual component and the mixture was well stirred. The insoluble component was removed by filtration. Hexane was distilled off from the filtrate to thereby obtain an isobutylene based polymer having a —Si(CH$_3$)(OCH$_3$)$_2$ group at both terminals.

An NMR analysis showed that —Si(CH$_3$)(OCH$_3$)$_2$ groups had been introduced into the polymer at about 80% of the terminals of its molecular chain.

PREPARATION EXAMPLE 2

Eight hundred grams of hydroxy terminated hydrogenated polybutadiene (Polytail HA of Mitsubishi Kasei Corporation) was mixed with 176 g of a solution of 28% NaOCH3 in MeOH and the mixture was subjected to an oxymetallization reaction for about 5 hours with degassing at 130° C. Thereafter, 99.1 g of 3-chloro-2-methyl-1-propene was added and the mixture was subjected to reaction for 3 hours at 90° C. The resulting crude product was purified. Analysis by NMR and GPC techniques showed that the purified liquid product was a polymer with an average molecular weight of 3,500 that had isopropenyl groups introduced at 76% of all the terminals.

A mixture of 40 g of above obtained polymer, 13.5 μl of chloroplatinic acid catalyst solution (0.2 mol/l solution of H$_2$PtCl$_6$.6H$_2$O in isopropanol) and 4.6 g of methyldichlorosilane was subjected to reaction for 8 hours at 85° C. as in Preparation Example 1. Thereafter, 8.7 ml of methyl orthoformate and 3.2 ml of methanol were added and the mixture was subjected to reaction for 3 hours at 70° C.

The amount of residual isopropenyl groups in the reaction solution as measured by an IR spectrum analysis was very small and almost negligible. Quantitative determination of reactive silicon groups by an NMR technique showed that almost 100% of the isopropenyl groups at the terminals of the molecular chain had been converted to (CH$_3$O)$_2$Si(CH$_3$)CH$_2$CH(CH$_3$)CH$_2$O groups.

EXAMPLES 1-2 AND COMPARATIVE EXAMPLES 1-2

One hundred parts of the isobutylene based polymer having reactive silicon groups at terminals of the molecular chain which had been prepared in Preparation Example 1 were mixed with 3 parts of tin octylate and 0.75 parts of laurylamine, both serving as a curing accelerator and the ingredients were stirred to form a fully uniform mixture (Example 1). In a similar way, 100 parts of the hydrogenated polybutadiene polymer having reactive silicon groups at terminals of the molecular chain which had been prepared in Preparation Example 2 were mixed with 3 parts of tin octylate and 0.75 parts of laurylamine and the ingredients were stirred to form a fully uniform mixture (Example 2). Each mixture was cast on a Teflon-coated plate to form a 0.5-mm thick sheet. The sheet was completely cured by standing at room temperature for 2 days and by subsequent heating at 50° C. for 4 days. In this way, sample sheets under test were prepared and measurements of moisture permeability and oxygen gas permeability were conducted on these sample sheets. The results are shown in Table 1.

Evaluation was also made of two comparative samples (Comparative Examples 1 and 2), i.e., the cured product of a polyether having reactive silicon groups at terminal groups (KANEKA MS Polymer-20A of Kanegafuchi Kagaku Kogyo Kabushiki Kaisha) and the cured product of silicone rubber (TORAY Silicone SE 1700 of Toray Silicone Co., Ltd.). The results are shown in Table 1.

Moisture Permeability

Measured in accordance with JIS Z 0208 (40° C.×90% r.h.)

Oxygen Gas Permeability

Measured in accordance with JIS Z 1707.

TABLE 1

| Example No. | 1 | 2 | Comp. Ex. 1 | Comp. Ex. 2 |
|---|---|---|---|---|
| Moisture permeability (g/m$^2$ · 24 hours) | 6.2 | 28 | >100 | >100 |
| O$_2$ gas permeability (× 10$^{-8}$, ml/cm · sec · atm) | 1.5 | 8.1 | 37 | 440 |

The data in Table 1 shows that the sealants of the present invention cure in the vicinity of room temperature and display excellent moisture and gas barrier properties. It is therefore clear that when used in the manufacture of double-layered glass, these sealants work very effectively to prevent moisture from getting into the dry air confined in the dead air space between the two glass plates.

EXAMPLES 3 AND 4

In Example 3, 100 parts of the isobutylene based polymer having reactive silicon groups at terminals of the molecular chain which was prepared in Preparation Example 1 were mixed with 20 parts of a paraffinic process oil (PW-90 of Idemitsu Kosan Co., Ltd. used as a plasticizer), 30 parts of hydrogenated polybutene (Polybutene OH of Idemitsu Petro-Chemical Co., Ltd. also used as a plasticizer), 100 parts of aliphatic acid treated calcium carbonate gel (CCR of Shiraishi Kogyo K.K. used as a filler), 1.0 part of diphenylsilane diol (used as a physical property modifier) and 1.0 part of a hindered phenolic antioxidant (Noklak NS-6 of Ohuchi Shinko Kagaku K.K.). In Example 4, 100 parts of the hydrogenated polybutadiene having reactive silicon groups at terminals of the molecular chain which was prepared in Preparation Example 2 were mixed with the same ingredients as mentioned above. In each of Examples 3 and 4, the ingredients were mixed well and further kneaded by passage through a three-roll paint mill. Each blend was mixed with a silanol condensation catalyst that had been prepared from 3 parts of tin octylate and 0.75 parts of laurylamine and the mixture was thoroughly kneaded to prepare a sealant.

Each of the sealants was coated on four aluminum spacing members measuring ca. 8 mm thick, 12 mm wide and 28 cm long. Two sides of each spacing member having the dimensions of 8 mm × 24 cm were coated with the sealants in a thickness of 2 mm covering a width of 5 mm. Thereafter, two sheets of float glass (30×30 cm) were compressed together, with the spacing members interposed therebetween, to make double-layered glass.

In Examples 3 and 4, the samples of double-layered glass had a sufficient mechanical strength to withstand handling in practice and they caused no detectable internal sweating or moisture condensation in the face of temperature variations.

The durability of the samples of double-layered glass was evaluated by 1000-h exposure to a sunshine carbon arc weatherometer (120-min cyclic exposures interrupted by 18-min spraying) and the integrity of the glass seal was maintained.

The above results show that when the sealant of the present invention is used with double-layered glass, it allows the two glass sheets to consistently adhere to a spacing (typically metallic) member over a prolonged time. In other words, the present invention enables double-layered glass to be manufactured using only one sealant without sacrificing the intended effects of the sealant which include strong adhesion, moistureproofing and gas barrier properties. Therefore, the manufacture of double-layered glass using the sealant of the present invention is very much improved in operational efficiency over the conventional double-seal technique.

While the invention has been described in detail and with reference to specific examples thereof, it will be apparent to one skilled in the art that various changes and modifications can be made therein without departing from the spirit and scope thereof.

What is claimed is:

1. In the process of sealing at least two glass plates to each other while maintaining a space therebetween, the improvement which comprises: applying to at least portions of at least one of said glass plates a sealant comprising at least one substantially saturated hydrocarbon polymer selected from the group consisting of isobutylene polymer and hydrogenated polybutadiene polymer, said substantially saturated hydrocarbon polymer having a molecular weight of 1000–15000 and having 1.1–5 silicon containing groups that have at least one hydroxyl or hydrolyzable group bonded to a silicon atom, said silicon containing group being present at terminals of the molecular chain of the substantially saturated hydrocarbon polymer; superposing said glass plates together such that said sealant contacts both plates; and curing said sealant.

2. A process of sealing glass plates as claimed in claim 1 wherein said silicon-containing group is represented by the formula (1):

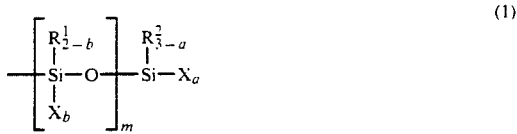

where each of $R^1$ and $R^2$ is independently a substituted or unsubstituted alkyl group having 1–20 carbon atoms, a substituted or unsubstituted aryl group having 6–20 carbon atoms, a substituted or unsubstituted aralkyl group having 7–20 carbon atoms, or a triorganosiloxy group represented by $(R^1)_3SiO-$, where $R^1$ is a monovalent hydrocarbon group having 1–20 carbon atoms, provided that the three groups denoted by $R^1$ may be the same or different, and when more than one $R^1$ or $R^2$ is present, they may be the same or different; X is a hydroxyl group or a hydrolyzable group, and when more than one X is present, they may be the same or different; a is 0, 1, 2, or 3; and b is 0, 1 or 2, provided that the sum of a and b is not less than 1; m is 0 or an integer of 1–19 and whem m is 2 or more, b in

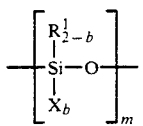

need not be the same.

3. A process of sealing glass plates as claimed in claim 2 wherein X in formula (1) is a hydrogen atom, a hydroxyl group, an alkoxy group, an acyloxy group, a ketoxymato group, an amino group, an amdio group, an aminooxy group, a mercapto group, or an alkenyloxy group.

4. A process of sealing glass plates as claimed in claim 2 wherein X in formula (1) is an alkoxy group.

* * * * *

UNITED STATES PATENT AND TRADEMARK OFFICE
CERTIFICATE OF CORRECTION

PATENT NO. : 5,120,379
DATED : June 9, 1992
INVENTOR(S) : Koji NODA et al

It is certified that error appears in the above-identified patent and that said Letters Patent is hereby corrected as shown below:

Title page, item [75], delete "Masavoshi"

and insert therefor -- Masayoshi --.

Title page, item [30], delete "Oct. 16, 1989" insert therefor -- Oct. 16, 1987 --.

Signed and Sealed this

Twenty-fourth Day of August, 1993

Attest:

BRUCE LEHMAN

*Attesting Officer*   *Commissioner of Patents and Trademarks*